United States Patent
Lee et al.

(10) Patent No.: US 7,072,680 B2
(45) Date of Patent: Jul. 4, 2006

(54) POWER CONTROL APPARATUS FOR ACHIEVING RESPECTIVE DESIRED SIGNAL QUALITY LEVELS IN WIRELESS COMMUNICATION SYSTEMS AND METHOD

(75) Inventors: Chieh-Ho Lee, Hsinchu (TW); Chung-Ju Chang, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 463 days.

(21) Appl. No.: 10/446,343

(22) Filed: May 28, 2003

(65) Prior Publication Data
US 2005/0032540 A1    Feb. 10, 2005

(51) Int. Cl.
  *H04B 7/00*   (2006.01)
  *H04Q 7/20*   (2006.01)
(52) U.S. Cl. ............... 455/522; 455/69; 455/67.13; 370/318; 370/320; 370/335
(58) Field of Classification Search ............... 455/522, 455/69, 67.11, 67.13, 63.1, 500; 370/317, 370/318, 320, 335, 330; 375/347
See application file for complete search history.

(56) References Cited

U.S. PATENT DOCUMENTS 6,157,687 A * 12/2000 Ono ........................... 375/347
2001/0002905 A1 * 6/2001 Funamori ..................... 370/342
2002/0021682 A1 * 2/2002 Ariyoshi et al. ............. 370/335
2004/0160921 A1 * 8/2004 Kaipainen et al. ........... 370/335
2005/0187728 A1 * 8/2005 Shin et al. ..................... 702/66

OTHER PUBLICATIONS

"Optimal Power Control in Interference-Limited Fading Wireless Channels with Outage-Probability Specifications" Kandukuri, et al.; Jan. 2002.

* cited by examiner

*Primary Examiner*—Edan Orgad
(74) *Attorney, Agent, or Firm*—Thomas, Kayden, Horstemeyer & Risley

(57) ABSTRACT

An apparatus and method is provided for controlling transmission power levels of respective mobile stations in a wireless cellular system, wherein the signal is transmitted from a transmitter at a controlled power level so that either the average received power level or the average signal to interference ratio (SIR) at receiver is close to a desired level so that the desired signal quality is achieved. According to a first embodiment, the desired level for the average received signal power is calculated based on the ensemble average intercell interference power level and the desired SIR levels. According to a second embodiment, the received average SIR level is estimated based on the average desired signal power and the ensemble average interference power. The average received power level (average SIR value) is compared to the desired level to generate a power control command. The power control command is fed back to the mobile station to instruct the adjustment of transmission power of the mobile station.

12 Claims, 3 Drawing Sheets

POWER CONTROL APPARATUS FOR ACHIEVING RESPECTIVE DESIRED SIGNAL QUALITY LEVELS IN WIRELESS COMMUNICATION SYSTEMS AND METHOD

BACKGROUND OF THE INVENTION

1. Field of the Invention

The present invention relates generally to wireless communication systems, and more particularly, to an apparatus and method for controlling the power levels of respective transmitters to achieve respective desired received signal quality levels in the wireless communication systems.

2. Description of the Related Art

In a cellular telephone or personal communication system (PCS), a large number of "mobile stations" communicate through cell sites or "base stations". Power control (PC) is one of the most important issues in cellular systems. There are three missions for a PC scheme. The first one is to resolve the near-far problem, which is accomplished by "outer-loop"(open-loop) PC. The second one is to mitigate the short-term fading so as to minimize the variation of the received signal power or signal to interference ratio (SIR), which is accomplished by "inner-loop"(closed-loop) PC. The third one is to save transmission power for longer battery life, which is usually related to the setting or adaptation of the threshold used in the PC algorithm. The transmitted signal experiences multipath fading as the mobile station moves in the environment that reflects the signal. Controlling mobile station transmitter power to overcome multipath fading is described in U.S. Pat. No. 5,056,109, entitled "METHOD AND APPARATUS FOR CONTROLLING TRANSMISSION POWER IN A CDMA MOBILE CELLULAR TELEPHONE SYSTEM," issued on Oct. 8, 1991 and incorporated herein by reference.

If the mobile station transmits an excessively powerful signal, it will interfere with the transmitted signals of other mobile stations. If the mobile station transmits an insufficiently powerful signal, the base station will be unable to recover the transmitted information from the received signal. In the above-referenced patent, the base station measures the power of the signal received from a mobile station and transmits power control commands to the mobile station over a separate channel. The commands instruct the mobile station to increase or decrease transmission power to maintain the average received signal power at a predetermined level. The base station must periodically adjust the transmission power of the mobile station to maintain an acceptable balance between interference and signal quality as the mobile station moves.

Given perfect outer-loop PC, the inner-loop PC schemes can be mainly divided into two categories: the strength-based PC scheme and the SIR-based PC scheme. The inner-loop power control in a strength-based manner is described in U.S. Pat. No. 5,257,283, entitled "SPREAD SPECTRUM TRANSMITTER POWER CONTROL METHOD AND SYSTEM," issued on Oct. 26, 1993 and in U.S. Pat. No. 5,267,262, entitled "TRANSMITTER POWER CONTROL SYSTEM," issued on Nov. 30, 1993 and incorporated herein by reference. But they did not mention how to set or adjust the desired received power threshold to achieve the required signal quality.

Method and apparatus to adjust the desired received power threshold is described in U.S. Pat. No. 5,216,692, entitled "METHOD AND APPARATUS FOR ADJUSTING A POWER CONTROL THRESHOLD IN A COMMUNICATION SYSTEMS," issued on Jun. 1, 1993 and in U.S. Pat. No. 5,396,516, entitled "METHOD AND SYSTEM FOR THE DYNAMIC MODIFICATION OF CONTROL PARAMETERS IN A TRANSMITTER POWER CONTROL SYSTEMS," issued on Mar. 7, 1995 and incorporated herein by reference. While, the major problem is that the power control threshold is adjusted in a step-wise manner, wherein the side effects include that a large adjustment step size can not fine tune the threshold value, while a small one will increase the response time of the power control mechanism.

Moreover, the SIR value is usually considered as an indicator of the signal quality and the SIR formula is the basic to design a SIR-based PC mechanism. The SIR-based PC is a more direct way to achieve the required signal quality, defined by SIR value, than the strength-based PC. Interestingly, there were many different forms of SIR formula used in the art. For example, the generation and use of SIR formula on PC method in the art with detail is provided in the article "Optimal power control in interference-limited fading wireless channels with outage-probability specifications," S. Kandukuri and S. Boyd, *IEEE Transactions on Wireless Communications*, Vol. 1, No. 1, pp. 46–55, January 2002. In their cases, to compute SIR value will need the sum of the individual interference signal power, however, which is impossible to be practically measured.

Accordingly, it would be desirable to calculate the power-level threshold values directly, instead of being adjusted in a step-wise manner, so that each required received signal SIR, which is measurable and can truly reflect the signal quality, is achieved. It would be also desirable to have a SIR-based power control according to such a SIR measurement as another way of implementing power control to achieve the desired signal quality. These problems and deficiencies are clearly felt in the art and are solved by the present invention in the manner described below.

SUMMARY OF THE INVENTION

It is a primary object of the present invention to provide a power control apparatus and method both in a strength-based manner and in a SIR-based manner for achieving the desired signal quality level for each received signal in the communication system.

It is another object of the present invention to provide an apparatus and method to update the power-level threshold values directly, not in a step-wise manner.

It is further object of the present invention to provide a power control apparatus and method operating at base stations by themselves.

In order to achieve the above objects, the present invention provides an apparatus and method for controlling transmission power levels of respective mobile stations in the system having at least one base station and at least one remote mobile station. According to a first embodiment, the power-level threshold values for respective received signals at the base station are calculated based on the ensemble average intercell interference power level and the desired SIR levels, which can be estimated by the base station itself. Especially, the power-level threshold values can be immediately updated as extra mobile station arrives at or departs from the cell. The received desired signal power on each communication link from the mobile to the base station is measured and is compared to the corresponding power-level threshold value to generate a power control command. The power control command is then fed back to the mobile station to instruct the adjustment of transmission power of the mobile station. By this way, the respective received power levels are controlled to approximate the respective power-level threshold values that are well calculated to guarantee each received signal quality.

According to a second embodiment, the received average SIR level is estimated based on the average desired signal power and the ensemble average interference power, which can be estimated by the base station itself. The received average SIR level is then compared to a respective desired level to generate a power control command. The power control command is then fed back to the mobile station to instruct the adjustment of transmission power of the mobile station. By this way, the each received SIR level is controlled to approximate the desired level to guarantee the received signal quality.

Other objectives advantages, and novel features of the invention will be more apparent from the following detailed description when taken in conjunction with the accompanying drawing.

DESCRIPTION OF THE PREFERRED EMBODIMENT

In a CDMA cellular communication system where system user capacity is a function of the total interference power, any reduction of mobile station power results in the reduction of its interference to other mobile stations, therefore facilitates an increase in system capacity. The present invention provides a method, apparatus and system for dynamically controlling the transmission power level of the mobile station. Through dynamic control over mobile station transmission power greater system capacity may be achieved.

Figure 1:
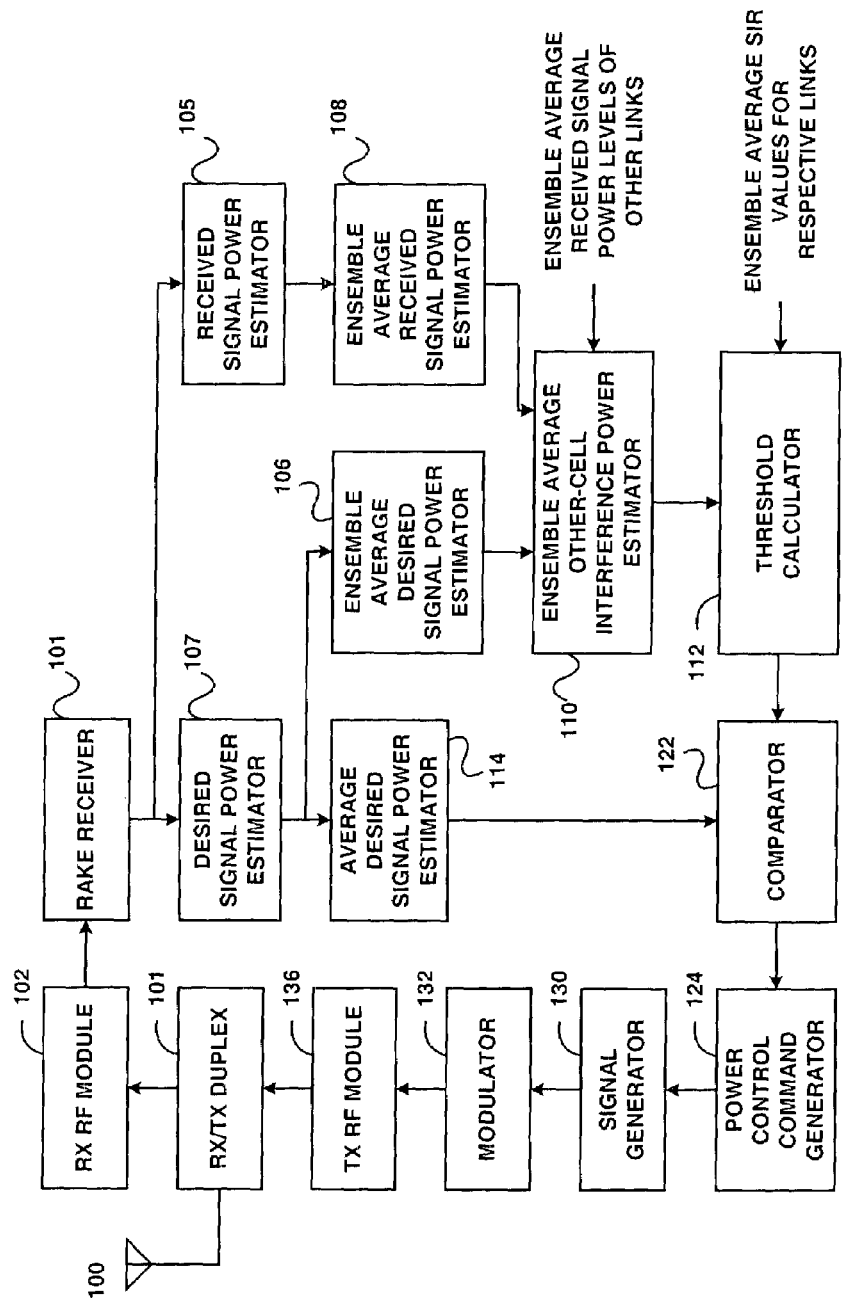
FIG. 1 is a block diagram showing a first preferred embodiment communication system using power control at the base station.

FIG. 1 is a block diagram showing a first preferred embodiment of communication system incorporating the uplink power control of the present invention for achieving target signal quality levels, wherein uplink means the communication link from the mobile station to its base station. In the wireless cellular communication system, there are a plurality of remotely located mobile stations and a base station in each cell. The preferred embodiment communication system of the present invention is directed to CDMA system, while other types of transmission systems like those based on TDMA and FDMA are also allowed. At least one mobile station transmits a communication signal at a controlled power level through a specified communication link. The communication signal transmitted by the mobile station, for example, is typically a CDMA signal of a spreading bandwidth for example of 1.25 MHz at one frequency band, to the base station. The received communication signal is fed to a RAKE receiver at the base station, which is used to take full advantage of the multipath diversity.

In order to aid in understanding of the first preferred embodiment, a discussion of the apparatus of the system is provided. Now referring to FIG. 1, the apparatus is simply provided with an antenna 100, a TX RX duplexer 101, a RX RF module 102, a RAKE receiver 104, an ensemble average desired signal power estimator 106, an ensemble average received signal power estimator 108, an ensemble average intercell interference power estimator 110, a threshold calculator 112, an average desired signal power estimator 114, a comparator 122, a power control command generator 124, a signal generator 130, a modulator 132, and a TX RF module 136. Notably, more than one receiving antenna can be used in accordance with the invention, for the convenience of description, one receiving antenna is used as an example.

Since at least one mobile station transmits a communication signal at a controlled power level through a specified communication link, the received signal at the antenna 100 of the base station is an aggregated signal including each signal of the mobile stations in the cell, each signal of the mobile stations in other cells, and the noise signal. The received signal passes through the TX RX duplexer 101 and then is provided to the RX RF module 102 for frequency down conversion and filtering. The RAKE receiver 104 receives the output signal from the RX RF module 102 and a PN code provided by the PN sequence generator (not shown). The RAKE receiver 104, which is well known to the person in the art, performs a despreading process and takes full advantage of the multipath diversity. Notably, a despreading process is performed so that the desired signal in the target uplink will be despreaded while the other communication signals, including the signal of other mobile stations in the cell, the signal of the mobile stations in other cells, and noise signal, remains in a spreaded status. For each uplink in the cell, the despreading code is just the spreading code associated with the target uplink. And the spreading codes varied in response to different uplinks.

The communication signal after above processing of the first embodiment is then provided for estimating the average power of the desired signal on the link, the ensemble average power of the desired signal on the link, ensemble average power of received signal on the link. The output of the RAKE receiver 104 is an aggregated signal including the desired signal of the target link, the intracell interference signal from the other mobile stations in the same cell, the intercell interference signal from the mobile stations in the other cells, and the noise signal. As well known to the person in the art, the output of RAKE receiver 104 at the kth data symbol duration is obtained in four parts by, $$Z_M[k]=r_M[k]+I[k]+I_S[k]+n[k] \quad (1)$$

where $r_M[k]$ denotes the desired signal, I[k] represents the interference signal consisting of the intracell interference signal and intercell interference signal, $I_S[k]$ is the multipath interference signal, and n[k] is the noise signal. Notably, $I_S[k]$ and n[k] are usually negligible and will be ignored hereafter.

Here we define some notations:

$$P_{Z,M}[k]=|Z_M[k]|^2 \quad (2)$$

denotes the power of the received signal $Z_M$ at time k at the output of RAKE receiver 104, and $$P_{r,M}[k]=|r_M[k]|^2 \quad (3)$$

denotes the power of the desired signal $r_M$ at time k at the output of RAKE receiver 104, and $$P_I[k]=|I[k]|^2 \quad (4)$$

denotes the power of the interference signal I at time k at the output of RAKE receiver 104, and $$\overline{P}_{Z,M} = var(Z_M[k]) = E(|Z_M[k]|^2) \tag{5}$$

denotes the ensemble variance of the received signal $Z_M$, or say, the ensemble average of the received signal power, and $$\overline{P}_{r,M} = var(r_M[k]) = E(|r_M[k]|^2) \tag{6}$$

denotes the ensemble variance of the desired signal $r_M$, or say, the ensemble average of the desired signal power, and $$\overline{P}_I = var(I[k]) = E(|I[k]|^2) \tag{7}$$

denotes the ensemble variance of the interference signal I, or say, the ensemble average of the interference signal power.

The output of the RAKE receiver 104 is then fed to the received signal power estimator 105 for estimating received signal power $P_{Z,M}[k]$ and to the desired signal power estimator 107 for estimating desired signal power $P_{r,M}[k]$. An ensemble average desired signal power estimator 106 is used to receive the output of the desired signal power estimator 107 for estimating the ensemble average desired signal power $\overline{P}_{r,M}$. And an ensemble average received signal power estimator 108 is used to receive the output of the received signal power estimator 105 for estimating the ensemble average received signal power $\overline{P}_{Z,M}$.

During a relatively long period of time, that is defined to be a time period appropriately long enough to average out the short-term fading while the long-term fading remains almost constant, the desired signal and the received signal are all ergodic random processes. Accordingly, the ensemble average of a signal power equals to the time average of the signal power. There are many methods to estimate the time average of a signal power. One approach is that the time average of a signal power is obtained by averaging the signal power over the relatively long period of time. Another approach is to use the running average method to estimate the time average of a signal power. Generally, the running average method has a formula like this, for example, $$\overline{P}_{r,M}[k] = \beta \cdot \overline{P}_{r,M}[k-1] + (1-\beta) \cdot P_{r,M}[k], \tag{8}$$

where β is a predetermined factor which is less than unity and usually closed to unity.

An ensemble average intercell interference power estimator 110 is used for estimating the ensemble average power of the intercell interference signal. It is known that the desired signal $r_M$ is statistically uncorrelated to the interference signal I, therefore we have $$\overline{P}_{zM} = \overline{P}_{rM} + \overline{P}_I. \tag{9}$$

Once the $\overline{P}_{Z,M}$ and $\overline{P}_{r,M}$ are estimated, $\overline{P}_I$ is obtained by, $$\overline{P}_I = \overline{P}_{ZM} - \overline{P}_{rM}. \tag{10}$$

It is well known that the interference signal consists of the intracell interference signal from the other mobile stations in the same cell and the intercell interference signal from the mobile stations in the other cells. It is also reasonable to assume that the intracell interference signal and the intercell interference signal are statistically uncorrelated to each other. Therefore, the ensemble average interference power $\overline{P}_I$ equals to the sum of the ensemble average intracell interference power $\overline{\Psi}_I$ and the ensemble average intercell interference power $\overline{\Psi}_O$. In general, the ensemble average interference power is obtained by $$\overline{P}_I = \frac{\overline{\Psi}_I + \overline{\Psi}_O}{G_M}. \tag{11}$$

The factor $G_M$ is a system parameter which is a predetermined positive number depending on processing gain of the uplink, the PN chip waveform and the cross-correlation property of the PN codes for the case of CDMA system. For TDMA and FDMA system $G_M$ is 1 for each M. Since the desired signals on the respective uplinks are uncorrelated to each other, the ensemble average intracell interference power is just the sum of the ensemble average desired signal power on each uplink in the cell except to the target link. That is, $$\overline{\Psi}_I = \sum_{m=1, m \neq M}^{L} \overline{P}_{r,m} \tag{12}$$

where L is the number of mobile stations in the cell. The ensemble average intercell interference power $\overline{\Psi}_O$ is theoretically the same for each uplink in the cell. By Eq. (10), (11), and (12), $\overline{\Psi}_O$ can be estimated by, $$\overline{\Psi}_O = G_M \overline{P}_{Z,M} - G_M \overline{P}_{r,M} - \sum_{m=1, m \neq M}^{L} \overline{P}_{r,m}. \tag{13}$$

That is, $\overline{\Psi}_O$ can be calculated based on the estimated ensemble average received signal power level $\overline{P}_{Z,M}$, the estimated ensemble average desired signal power levels $\{\overline{P}_{r,M}, M=1, \ldots, L\}$, and the system parameter $G_M$. Furthermore, $\overline{\Psi}_O$ can be estimated with improved precision by averaging Eq. (13) over the index M, $$\overline{\Psi}_O = \frac{1}{L} \sum_{M=1}^{L} \left( G_M \overline{P}_{Z,M} - G_M \overline{P}_{r,M} - \sum_{m=1, m \neq M}^{L} \overline{P}_{r,m} \right). \tag{14}$$

In this case, $\overline{\Psi}_O$ is calculated based on the estimated ensemble average received signal power levels $\{\overline{P}_{Z,M}, M=1, \ldots, L\}$, the estimated ensemble average desired signal power levels $\{\overline{P}_{r,M}, M=1, \ldots, L\}$, and the system parameters $\{G_M, M=1, \ldots, L\}$.

A threshold calculator 112 is used for computing the power-level threshold value for each uplink in the cell based on the ensemble average intercell interference power level and the preset desired ensemble average SIR values for the respective uplinks. The threshold calculator 112, which includes appropriate internal counters, program memory and data memory, computes under program control a power-level threshold value as described below and provides the power-level threshold value regarding to the target link to a comparator 118. The threshold calculator 112 may be either located at the base station through which the mobile station is in communication with or at a remote location such as the mobile telephone switching office (not shown).

The instantaneously received SIR $\Gamma_M$ at the output of RAKE receiver 104 for the target link is obtained by $$\Gamma_M[k] = \frac{|r_M[k]|^2}{\text{var}(I[k])} = \frac{P_{r,M}[k]}{\overline{P}_I}. \quad (15)$$

By Eq. (11), and (12), we now have $$\Gamma_M[k] = G_M \cdot \frac{P_{r,M}[k]}{\sum_{m=1,m\neq M}^{L} \overline{P}_{r,m} + \Psi_O}, M = 1, \ldots, L. \quad (16)$$

Taking ensemble average operation on both sides of Eq. (16), we have a L-equation L-unknown system like this $$\begin{cases} G_1 \cdot \overline{P}_{r,1} - \overline{\Gamma}_1 \cdot \overline{P}_{r,2} - \cdots - \overline{\Gamma}_1 \cdot \overline{P}_{r,L} = \overline{\Gamma}_1 \cdot \Psi_O \\ -\overline{\Gamma}_2 \cdot \overline{P}_{r,1} + G_2 \overline{P}_{r,2} - \cdots - \overline{\Gamma}_2 \cdot \overline{P}_{r,L} = \overline{\Gamma}_2 \cdot \Psi_O \\ \vdots \\ -\overline{\Gamma}_L \cdot \overline{P}_{r,1} - \cdots - \overline{\Gamma}_L \cdot \overline{P}_{r,L-1} + G_L \overline{P}_{r,L} = \overline{\Gamma}_L \cdot \Psi_O \end{cases} \quad (17)$$

where $$\overline{\Gamma}_M = E(\Gamma_M[k]), \text{ for } M=1, \ldots, L \quad (18)$$

are the ensemble average SIR levels. Once the desired values of $\{\overline{\Gamma}_M, M=1, \ldots, L\}$ are chosen and the ensemble average intercell interference power $\Psi_O$ is measured, the factors $\{\overline{P}_{r,M}, M=1, \ldots, L\}$ can be calculated by solving the L equations-L unknowns system in (17). Especially, as extra mobile station arrives at or departs from the cell, the solution $\{\overline{P}_{r,M}\}$ can be recalculated immediately so that the power control threshold can be adjusted quickly corresponding to the new situation.

The required signal quality on the link can be met by properly determining the desired value of $\overline{\Gamma}_M$. Depending on the practical interest, the signal quality can mean just the ensemble average SIR or ensemble average BER, which is defined to be the ensemble average of the instantaneous BER. Generally speaking, $\overline{\Gamma}_M$ is a function of average BER, $\overline{\text{BER}}$. Once the desired average BER and the $\overline{\text{BER}}$-$\overline{\Gamma}_M$ relation curve is determined, the desired $\overline{\Gamma}_M$ is obtained based on $\overline{\text{BER}}$ and the $\overline{\text{BER}}$-$\overline{\Gamma}_M$ relation curve. One way to determine the $\overline{\text{BER}}$-$\overline{\Gamma}_M$ relation curve is from experimental results. Another way to determine the $\overline{\text{BER}}$-$\overline{\Gamma}_M$ relation curve is from analysis reports. As well known to a person in the art, the analytical $\overline{\text{BER}}$-$\overline{\Gamma}_M$ relation curve can be easily derived based on the BER-SIR curve on the modulation scheme and the probability density function of the SIR given in (15).

Finally, the resultant threshold is calculated by multiplying $\overline{P}_{r,M}$ with a factor $\alpha_M$, which accounts for the statistic ratio of a threshold to the corresponding ensemble average received signal power. For the case that the ensemble average of the received signal power under power control is close to the power control threshold, the factor $\alpha_M$ can be set to 1. For another case of the mobile cellular system, the ensemble average received signal power is normally higher than the power control threshold, therefore the factor $\alpha_M$ is less than unit. The factor $\alpha_M$ can be determined by experience, or by analytical calculation.

An average desired signal power estimator 114 is used to receive the output of the desired signal power estimator 107 for estimating the average received power of desired signal on the target link over one power control period. For example, the average desired signal power $P_{r,M}$ is estimated by calculating the following equation:

$$P_{rM} = \frac{1}{K}\sum_{K=K_0}^{k_0+K-1}|r_M[K]|^2 = \frac{1}{K}\sum_{K=K_0}^{K_0+K-1}P_{rM}[K], \quad (19)$$

where $k_0$ is the beginning time instant of the power control period, and K data symbols are contained within one power control period.

A comparator 122 is used for comparing the power-level threshold value from the threshold calculator 112 and the average desired signal power from the average desired signal power estimator 114. The power control command generator 124 receives the results from the comparator 122 and periodically generates a power control command to be transmitted to the corresponding mobile station. The power control command can be generally a n-bit command in the invention. Take n=1 as an example, the power control command is either a power up command or a power down command. If the average desired signal power is under the power-level threshold value, then the power control command generator 124 generates a power up command. Similarly, if the average desired signal power exceeds the power-level threshold value, then the power control command generator 124 generates a power down command.

In the signal generator 130, transmission frame is constructed including the power control command sent from the power control command generator 124, and outputted to the modulator 132. The modulator 132 modulates and spreads the transmission signal and then the output signal to the TX RF unit 136 for frequency upconversion to obtain a TX RF signal. Through the RX/TX duplex 101 and the antenna 100, the TX RF signal is transmitted. Notably, all the functions of the blocks in FIG. 1 can be performed by respective base stations, therefore the first embodiment of the present invention is a fully distributed apparatus and method that can be automatically operated at base stations.

Figure 2:
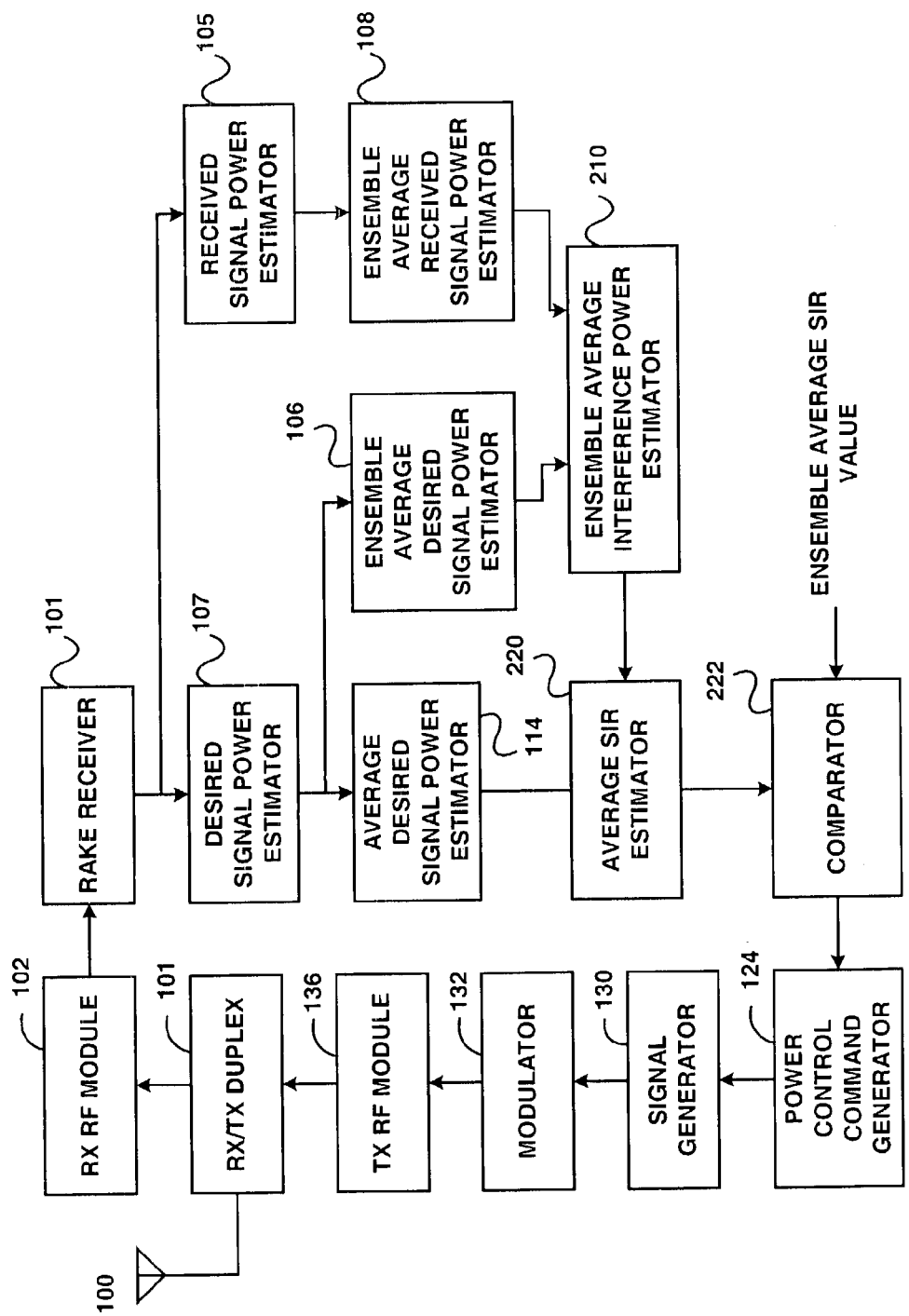
FIG. 2 is a block diagram showing a second preferred embodiment communication system using power control at the base station.

FIG. 2 is a block diagram showing a second preferred embodiment of communication system that uses power control for achieving desired signal quality levels on the uplink. In other words, the communication link is from the mobile station to its base station. The communication condition of the second embodiment is similar to the first embodiment. A discussion of the apparatus of the system is provided. Now referring to FIG. 2, the apparatus is simply provided with an antenna 100, a TX RX duplexer 101, a RX RF module 102, a RAKE receiver 104, a received signal power estimator 105, a desired signal power estimator 107, an ensemble average desired signal power estimator 106, an ensemble average received signal power estimator 108, an average desired signal power estimator 114, an ensemble average interference power estimator 210, an average SIR estimator 220, a comparator 222, a power control command generator 124, a signal generator 130, a modulator 132, and a TX RF module 136. Notably, more than one receiving antenna is allowed in the invention, in order to ease the description, the case of one receiving antenna is considered.

The functions of the antenna 100, the RF module 102, the RAKE receiver 104, the received signal power estimator 105, the desired signal power estimator 107, the ensemble average desired signal power estimator 106, the ensemble average received signal power estimator 108, and the average desired signal power estimator 114 of the second embodiment are similar to the respective corresponding ones in the first embodiment. We do not repeat them here again. The communication signal after above processing of the second embodiment is then provided for estimating the average desired signal power on the link and the ensemble average interference power.

An ensemble average interference power estimator 210 is used for estimating the ensemble average power of the interference signal. It is reasonable to assume that the desired signal $r_M$ is statistically uncorrelated to the interference signal I, so we have the following equation:

$$\overline{P}_{Z,M} = \overline{P}_{r,M} + \overline{P}_I, \tag{20}$$

wherein $\overline{P}_{Z,M}$ refers to the output of the ensemble average received signal power estimator 108, and $\overline{P}_{r,M}$ the output of the ensemble average desired signal power estimator 106. Therefore, once the $\overline{P}_{Z,M}$ and $\overline{P}_{r,M}$ are estimated, the ensemble average interference power $\overline{P}_I$ is obtained by, $$\overline{p}_I = \overline{p}_{zM} - \overline{p}_{rM}. \tag{21}$$

Since the desired signal, and the received signal will all be ergodic random processes after a relatively long period of time, so the ensemble average of a signal power equals to the time average of the signal power. There are many methods to estimate the time average of a signal power. One way is that the time average of a signal power is obtained by averaging the signal power over a relatively long period of time, wherein the relatively long period of time is defined to be a time period that is appropriately long so that the short-term fading can be averaged out while the long-term fading remains almost constant. Another way is to use the running average method to estimate the time average of a signal power. Generally, the running average method has a formula like that in the first embodiment.

An average desired signal power estimator 114 for estimating the average received power of desired signal of the communication signal over one power control period. For example, the average desired signal power $P_{r,M}$ is estimated in Eq. (19).

An average SIR estimator 220 is used for estimating the average SIR level of the communication signal based on the average desired signal power $P_{r,M}$ and the ensemble average interference power $P_I$. More specifically, the average SIR $\Gamma_M$ is obtained from the following equation:

$$\Gamma_M = \frac{P_{rM}}{p_I}. \tag{22}$$

It is appreciated that the SIR formula in Eq. (22) is based on a relatively long period of time that is appropriately long so that the short-term fadings can be averaged out while the long-term fadings are almost constant since mobile stations move only a little. Therefore, during such a relatively long period of time, the long-term fading, which is the local mean of the channel gain, is treated as time-constant, and the short-term fading is usually modeled as a stationary random process. Accordingly, the channel gain, that is the product of the long-term and the short-term fading, becomes a stationary random process. In addition, the transmission power under power control are also assumed to be stationary. Therefore, during a relatively long period of time, the instantaneously received SIR is equal to the ratio of the instantaneously received signal power to the ensemble average of the interference signal power obtained. And the average SIR is equal to the ratio of the average received signal power to the ensemble average interference power.

Due to our different viewpoint using "relatively long period of time", the SIR scheme of the embodiments of the present invention are different from those in the art. For example, the SIR in the article "Optimal power control in interference-limited fading wireless channels with outage-probability specifications," S. Kandukuri and S. Boyd, *IEEE Transactions on Wireless Communications*, Vol. 1, No. 1, pp. 46–55, January 2002, is defined to be the ratio of desired signal power to a sum of the individual instantaneous interference signal power. Thus, to compute SIR, it will need the sum of the individual interference signal power. However, it is not practical in actual practice to get such measurement. The reason is that, from the point of view of the signal vector space, each individual interference signal acts like a vector and the received interference signal at each time instant is just the resultant vector of individual interference signal vectors. Obviously, it is impossible to practically extract the individual vectors and compute their sum from the received resultant vector. Hence, such a SIR formula has only analytical meaning. And any power control apparatus based this SIR formula will become impractical.

On the other hand, the numerator (i.e. the average of the interference signal and noise power) of the SIR formula of the present invention would be measurable if the interference signal random processes are assumed to be stationary and ergodic during the relatively long period of time, or if the interference signal random processes are quasi-stationary, but can be treated stationary and ergodic during the relatively long period of time. Hence the ensemble average of the interference signal power can be replaced by the their time average, which can be estimated, for example, by a running average method.

Generally speaking, the SIR formula in Eq. (22) can be employed in any communication system to estimate the average SIR level over a period of time. Once during a relatively long period of time, all the received signal, desired signal, and the interference signal can be treated as stationary random processes, and the relatively long period of time is longer than the coherent times of these random processes. After that, the ensemble average values can obtained by calculating the time average over the relatively long period of time. Here, the coherent time W of a random process s(t) is a time period so that $s(t_1)$ and $s(t_2)$ are highly correlated as $|t_1-t_2|<W$. Of course, another way to estimate the ensemble value is to use the running average method.

A comparator 222 is used for comparing the average SIR level from the average SIR estimator 220 and a preset desired SIR level for the uplink. The power control command generator 124 receives the results from the comparator 222 and periodically generates a power control command to be transmitted to the corresponding mobile station. The power control command can be generally a n-bit command in accordance with the invention. Take n=1 as an example, the power control command is either a power up command or a power down command. If the average SIR level falls below the desired SIR level, then the power control command generator 124 generates a power up command. Similarly, if the average SIR level exceeds the desired SIR level, then the power control command generator 124 generates a power down command. The power control command from the power control command generator 124 is then fed to the signal generator 130. The functions of the signal generator 130, the modulator 132, the TX RF module 36, and the RX/TX duplex in the second embodiment are the same as the respective corresponding ones in the first embodiment. Notably, all the functions of the blocks in FIG. 2 can be performed by respective base stations. Thus, the first embodiment of the present invention is a fully distributed apparatus and method that can be automatically operated at base stations.

Figure 3:
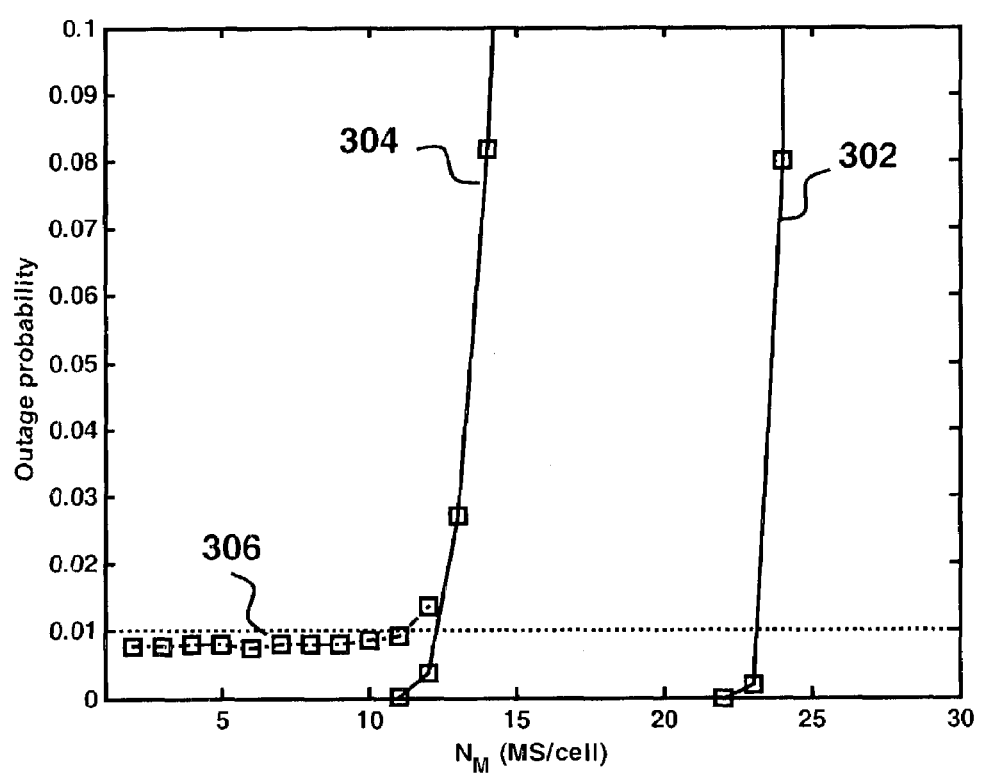
FIG. 3 illustrates exemplary simulation curves that show the performance advantage of one embodiment of the present invention.

FIG. 3 illustrates a simulation result of outage probability versus the system capacity curves. It shows the performance advantage of one embodiment of the present invention. Here the outage probability is defined as a probability of the received SIR level that falls below the specified level. And the system capacity is defined as the maximum number of mobile stations in each cell at a required outage probability of about 1%. In the simulations, the wireless system is assumed to have 37 cells in a hexagonal-grid configuration. The propagation exponent is 3.5. The number of resolvable paths of the multipath channel model is 2. The processing gain is 128. And the desired SIR level is 6.79 dB to achieve BER=$10^{-3}$ for BPSK modulation. The Rayleigh fading random processes are generated by the well-known Jake's model. The set of long-term fadings is randomly generated according to the channel model and that the mobile station locations are uniformly distributed. Also, the simulation is based on the following assumptions: 20 km/hr for the velocity of each mobile station, 1 dB for the step size of power adaptation, ⅔ ms for the power control period, and one power control period for the loop delay.

The curve 302 represents to the performance curve of the power control of the present invention. The curve 304 represents the performance curve of the conventional strength-based power control in the art. And the curve 306 represents the performance curve of the conventional SIR-based power control in the art. The conventional strength-based power control is a power control that the power level of each received desired signal in the system is controlled to approximate a desired level. The conventional SIR-based power control is a power control that the received SIR level of each signal in the system is controlled to approximate a desired level, in which the SIR is defined as the ratio of the average received signal power to the average interference power. If the required outage probability is equal to 1%, it can be found that the power control of the present invention attains higher system capacity than both the conventional strength-based power control and the conventional SIR-based power control.

In summary, the preferred embodiments of the present invention can be practically implemented and characterized as:

(1) In accordance with the power control apparatus or method of the present invention, the received signal quality on the communication link can be approached to the respective predetermined desired level, in which the signal quality could represent the received SIR level or the BER level. Since the signal quality is well controlled via power control of the present invention, so the number of the bad quality communication links is reduced. The number of the good quality communication links is also reduced. It causes more system resource to be released and the system capacity enhanced. Eventually, the overall system performance can be enhanced.

(2) What the power control apparatus or method of the present invention needs in calculating SIR is the local mean of the interference signal power rather than the sum of the individual instantaneous interference signal power. It is because the former value is practically measurable while the latter not.

(3) The power control apparatus or method of the present invention is a fully distributed scheme that can be automatically operated at base stations.

(4) Whenever a mobile station arrives or leaves a cell, the power-level threshold values in accordance with the first embodiment of the present invention can be readily adapted without having to be converged step by step.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system power control scheme as described were directed to CDMA spread spectrum signals transmitted over a radio communication link. However, as will be understood by those skilled in the art, the power control techniques described and claimed herein can also be adapted for use in other types of transmission systems like those based on TDMA and FDMA. In addition the said interference signal of the above description can be extended to an interference plus noise signal. In addition the communication link could alternatively be an electronic data bus, wireline, optical fiber link, or any other type of communication link.

What is claimed is:

1. An apparatus for adjusting power-level threshold values for use in a wireless communication system having a receiver for receiving communication signals through communication links, wherein each of said communication signals is transmitted from a remote transmitter at a controlled power level, said apparatus comprising:
    means for measuring power levels of desired signals on said communication links;
    means for measuring power levels of received signals on said communication links;
    means for obtaining statistical values of said desired signals by performing an operation over the power levels of said desired signals;
    means for obtaining statistical values of said received signals by performing an operation over the power levels of said received signals;
    means for estimating a power level of an ensemble average intercell interference based on at least one of the statistical values of said received signal and at least one of the statistical values of said desired signals; and
    means for averaging the power levels of said desired signals to approximate power-level threshold values based on the power level of said ensemble average intercell interference and a desired ensemble average SIR (signal to interference ratios).

2. The apparatus as claimed in claim 1, wherein said operation over the power levels of said desired signals and said operation over the power levels of said received signals are respectively performed by receiving a plurality of input values and outputting an average input value as an ensemble average value over a time period substantially long enough for averaging short-term fading.

3. The apparatus as claimed in claim 1, wherein said operation over the power levels of said desired signals and said operation over the power levels of said received signals are respectively performed by receiving an input value and outputting a running average input value as an output value.

4. An apparatus for estimating an average signal to interference ratio (SIR) over a time period comprising:

means for measuring an average power level of desired signals over a time period;

means for estimating a power level of ensemble average interference, wherein said means for estimating said power level of said ensemble average interference comprises:

means for obtaining a statistical value of said desired signals by performing an operation over the power level of said desired sinnals:

means for estimating a power level of received signals:

means for obtaining a statistical value of said received signals by performing an operation over the oower level of said received signals; and means for calculating said ensemble average interference by subtracting said statistical value of said desired signals from said statistical value of said received signals; and means for computing said average SIR value based on said average power level of said desired signals and the power level of said ensemble average interference.

5. The apparatus as claimed in claim 4, wherein said operation over the power level of said desired signals and said operation over the power level of said received signals are respectively performed by rccciving a plurality of input values and outputting an average input values as an ensemble average value over a time period substantially long enough for averaging short-term fading.

6. The apparatus as claimed in claim 4, wherein said operation over the power level of said desired signals and said operation over the power level of said received signals are respectively performed by receiving an input value and outputting a running average input value as an output value.

7. A method for adjusting power-level threshold values for use in a wireless communication system having a receiver for receiving communication signals through communication links, wherein each of said communication signals is transmitted from a remote transmitter at a controlled power level, said method comprising:

measuring power levels of desired signals on said communication links;

measuring power levels of received signals on said communication links;

obtaining statistical values of said desired signals by performing an operation over the power levels of said desired signals;

obtaining statistical values of said received signals by performing an operation over the power levels of said received signals;

estimating a power level of an ensemble average intercell interference based on at least one of the statistical values of said received signal and at least one of the statistical values of said desired signals; and averaging the power levels of said desired signals to approximate power-level threshold values based on the power level of said ensemble average intercell interference and a desired ensemble average SIR (signal to interference ratios).

8. The method as claimed in claim 7, wherein said operation over the power levels of said desired signals and said operation over the power levels of said received signals are respectively performed by receiving a plurality of input values and outputting an average input value as an ensemble average value over a time period substantially long enough for averaging short-term fading.

9. The method as claimed in claim 7, wherein said operation over the power levels of said desired signals and said operation over the power levels of said received signals are respectively performed by receiving an input value and outputting a running average input value as an output value.

10. A method for estimating an average signal to interference ratio (SIR) over a time period comprising:

measuring an average power level of desired signals over a time period;

estimating a power level of ensemble average interference, wherein said estimating step comprises the steps of:

obtaining a statistical value of said desired signal by performing an operation over said averace power level of said desired signals;

estimating a power level of received signals;

obtaining a statistical value of said received signal by performing said operation over the power level of said received signal; and calculating said ensemble average interference by subtracting said statistical value of said desired signal from said statistical value of said rcceivcd signal; and computing said average SIR value based on said average power level of said desired signals and the power level of said ensemble average interference.

11. The method as claimed in claim 10, wherein said operation over the power levels of said desired signals and said operation over the power levels of said received signals are respectively performed by receiving a plurality of input values and outputting an average input value as an ensemble average value over a time period substantially long enough for averaging short-term fading.

12. The method as claimed in claim 10, wherein said operation over the power levels of said desired signals and said operation over the power levels of said received signals are respectively performed by receiving an input value and outputting a running average input value as an output value.

* * * * *